(12) United States Patent
Lippman

(10) Patent No.: US 10,507,945 B1
(45) Date of Patent: Dec. 17, 2019

(54) LOW FREQUENCY MODULATED HEAT SEALING APPARATUS AND METHOD

(71) Applicant: Glenn Lippman, Boca Raton, FL (US)

(72) Inventor: Glenn Lippman, Boca Raton, FL (US)

( * ) Notice: Subject to any disclaimer, the term of this patent is extended or adjusted under 35 U.S.C. 154(b) by 0 days.

(21) Appl. No.: 15/041,408

(22) Filed: Feb. 11, 2016

(51) Int. Cl.
| | |
|---|---|
| *B32B 37/00* | (2006.01) |
| *B65B 51/26* | (2006.01) |
| *B29C 65/00* | (2006.01) |
| *B29C 65/30* | (2006.01) |
| *B29C 65/78* | (2006.01) |

(52) U.S. Cl.
CPC .............. *B65B 51/26* (2013.01); *B29C 65/30* (2013.01); *B29C 65/7841* (2013.01); *B29C 66/11* (2013.01); *B29C 66/81* (2013.01); *B29C 66/824* (2013.01)

(58) Field of Classification Search
USPC ...................................................... 156/583.1
See application file for complete search history.

(56) References Cited

U.S. PATENT DOCUMENTS

| | | | | |
|---|---|---|---|---|
| 2011/0036816 A1* | 2/2011 | Hou | ....................... | B23K 11/115 |
| | | | | 219/91.2 |
| 2011/0268371 A1* | 11/2011 | Kristal | .................... | B29C 59/02 |
| | | | | 383/5 |
| 2013/0037528 A1* | 2/2013 | Ogake | ................ | B23K 11/0033 |
| | | | | 219/127 |

* cited by examiner

*Primary Examiner* — James D Sells
(74) *Attorney, Agent, or Firm* — Frank L. Kubler

(57) ABSTRACT

A heat sealing apparatus including a first sealing bar having a first sealing bar contact surface with a first resistance heating element extending along the upper sealing bar contact surface; a second sealing bar having a second sealing bar contact surface; a sealing bar moving mechanism for moving the first sealing bar and the second sealing bar away from and toward each other into compression contact; a power pulsing mechanism including a microprocessor running a computer program for delivering electric power pulses to the first resistance heating element in selected pulse durations separated by at least one selected interval duration and at a frequency between 0.001 and 5000 Hertz; an electric power source and an apparatus circuit including the first resistance heating element and the sealing bar moving mechanism.

16 Claims, 3 Drawing Sheets

| CF1 | Parameters | SET |
|---|---|---|
| PLS | 1.00 | |
| PWD | 5.00 | MATL A |
| MLPS | 0003 | MATL B |
| COOL | 20.00 | Menu |

Frequency: 0.5 Hz  FIG. 2

| FINDLEY | Parameters | SET |
|---|---|---|
| PLS | 0.91 | |
| PWD | 0.92 | MATL A |
| MLPS | 0040 | MATL B |
| COOL | 09.30 | Menu |

Frequency: 219 Hz  FIG. 2C

| DUROLAST | Parameters | SET |
|---|---|---|
| PLS | 0.11 | |
| PWD | 0.20 | MATL A |
| MLPS | 0050 | MATL B |
| COOL | 35.00 | Menu |

Frequency: 162 Hz  FIG. 2A

| 35 MIL PVC | Parameters | SET |
|---|---|---|
| PLS | 0.15 | |
| PWD | 0.20 | MATL A |
| MLPS | 0012 | MATL B |
| COOL | 05.00 | Menu |

Frequency: 34 Hz  FIG. 2D

| PVC-TEX | Parameters | SET |
|---|---|---|
| PLS | 0.60 | |
| PWD | 0.40 | MATL A |
| MLPS | 0007 | MATL B |
| COOL | 20.00 | Menu |

Frequency: 7 Hz  FIG. 2B

| VINYL 27 | Parameters | SET |
|---|---|---|
| PLS | 0.13 | |
| PWD | 0.15 | MATL A |
| MLPS | 0225 | MATL B |
| COOL | 08.00 | Menu |

Frequency: 804 Hz  FIG. 2E

*All Rights Reserved
Confidential*

LOW FREQUENCY MODULATED HEAT SEALING APPARATUS AND METHOD

BACKGROUND OF THE INVENTION

Field of the Invention

The present invention relates generally to the field of heat sealing layers or sheets of material together. More specifically the present invention relates to an apparatus and method of heat sealing, where the apparatus includes a first sealing bar preferably in the form of an upper sealing bar with an upper resistance heating element extending along the upper sealing bar lower surface, and a lower sealing bar with a lower resistance heating element extending along the lower sealing bar upper surface, and sealing bar moving means for moving the upper sealing bar and lower sealing bar away from each other as well as toward and into compression contact with each other, a power pulsing means for delivering electric power to the upper and lower resistance heating elements in measured intermittent pulses and intervals between pulses, an electric power source and an apparatus circuit including the upper and lower resistance heating elements and sealing bar moving means.

The power pulsing means preferably includes microprocessor, a computer program which permits selection of various pulse durations and interval durations to optimize heat pulsing, these durations preferably being pre-programmed for specific types of materials to be sealed together. The pulse durations are heating durations, and the interval durations are cooling durations. The bar moving means preferably includes a pneumatic cylinder which is connected to and spaces such as through elevating the upper sealing bar relative to the lower sealing bar to space apart the upper and lower sealing bars, and which lowers the upper sealing bar into contact with the lower sealing bar with compressive force. The apparatus preferably is a simple "poster style" press, modified to include these inventive features. Configuring the apparatus in the form of any of a variety of other types of presses is contemplated as well, such as a cantilever press. The sealing bars may have a variety of shapes other than the preferred elongate shape, including non-elongate and non-linear shapes. The electric power source preferably is a power cord extending to a wall outlet or other power source connection.

The heating elements preferably are ribbon types or banding types, such as Nichrome banding strips. It is contemplated that the heating elements can have other configurations and compositions as well. Each can be shaped as a bar or block, for example, rather than a ribbon. Yet not all configurations or materials are suitable. A heating element in the shape of a wire would tend to cut materials to be sealed, and Cal Rod is not believed to be suitable heating element material.

The method is primarily executed by the computer program, with additional steps being performed by a human operator. The operator operates the bar moving means to space the upper and lower sealing bars from each other, stacks at least two sheets of material to be sealed together into face to face contact with each other, as defined below in the Detailed Description, and places these stacked sheets between the spaced apart the upper and lower sealing bars. Then the operator operates the sealing bar moving means to bring the upper and lower sealing bars toward each other and into compressive contact with the sheets so that the sheets are compressed together with a desired magnitude of force. Then the power pulsing means is actuated either manually by the operator or automatically by the program, to begin delivering pulses of electricity through the upper and lower resistance heating elements, which thereby deliver corresponding pulses of heat into the sheets of material.

A key inventive feature of this method is that the pulses are low-frequency, modulated pulses. Examples of such pulses are as follows. Sealing three layers of a heavy thermoplastic material may require 12 cycles of heat energy pulse width of 0.20 second and non-heat energy pulse (absorption) width of 0.10 seconds; followed by a period of cooling time of three seconds. In this example, the three sheets or layers were heat sealed in 6.6 seconds. Current testing frequencies for the present invention have ranged from 0.001 to 1,200 Hz. Based on the scope of use and available current technology, the maximum frequency is anticipated to be about 5000 Hz (5 KHz). As the technology improves and higher speed processing becomes available, the maximum frequency is subject to increase, however, within a low frequency range.

The pulses of heat and intervals between pulses provided by the present invention are not arbitrary, but rather are selected so that the pulses deliver packets of heat into the sheet materials for durations that raise sheet outer surface temperatures to levels below that which would yellow or otherwise damage the sheet materials, by delivering heat into them for sufficiently short durations, and yet along enough to progressively raise the temperature of the sheets where they abut each other to a level that causes sufficient melting of the sheet materials to bond them together. Each cooling interval between pulses is of a duration to permit the sheet materials to absorb the heat to their inner contacting surfaces while outer sheet surface temperatures fall accordingly as the temperature within the sheets progressively equalizes. Only then does the next pulse begin and optionally repeat the cycle a preprogrammed number of times. As a result, unlike in impulse heat sealing, damaging temperatures and durations are not reached, and heat is transferred into the materials in a series of discrete packages, which weld the sheets together far more quickly and efficiently. Once again, unlike in impulse heat sealing, pulses and intervals between pulses are selected relative to the material or materials of the sheets being sealed together, that will deliver packages of heat that can be absorbed into the particular material at the natural rate for the material.

Alternatively, a strip of sealing tape can be placed between the sheets of material to be sealed, which melts and bonds the adjacent materials together with the application of heat. While the use of sealing tape is not new, the present apparatus and method permit the sheets of material to be bonded together in this way in a fraction of the time needed using prior methods and without damaging the sheet material.

It is contemplated that materials having shapes other than sheets or layers, such as blocks or bars, may be sealed together using the present apparatus and method. It is further contemplated, although less preferred, that a heating element be provided along only one of the first and second, or upper and lower sealing bars, or that only one of the first and second heating elements be operated, or that only one be operated at a time.

Where sheets of two or more different materials are being sealed together, it is contemplated that the program deliver differently timed pulses and intervals to the two or more different materials through the first and second heating elements to accommodate the heat absorption rate and capacity differences of the two or more materials.

2. Description of the Prior Art

There have long been devices and methods for sealing two or more adjacent pieces of material together. For purposes of this application, the term "seal" is understood to mean creating heat to at least partially melt the pieces of material where they meet each other to weld the pieces together, or placing a strip of bonding material such as sealing tape between the pieces of material and creating heat to melt the strip to bond the pieces of material together.

This background will assume a basic knowledge of why heat sealing is used and that different methods are application specific. It also assumes that heat sealing is predominantly performed on thermoplastic materials or, if treated, thermoset materials that emulate thermoplastic materials for the purpose of sealing. And, that there is an understanding that most thermoplastic materials require a two step process of applying heat under pressure followed by cooling with or without pressure. There are also many forms of heat sealing. This background will define prior methods used in bar sealing.

One such method is hot die or heated platen sealing, in which materials to be sealed are placed between one or two previously heated platen surfaces. Next, a press acts on both heated surfaces to apply heat to the materials between the surfaces. If removing heated materials and exposing them to ambient air does not complete the seal, then they are placed between two unheated plates or surfaces with or without pressure to complete the heat sealing process. This method requires an always on heat source, which is not energy efficient, and furthermore this method creates a limitation on what materials or applications can be heat sealed.

Hot die or platen sealing was followed by impulse sealing. Impulse sealing uses electricity to heat the resistance heating elements such as in the form of Nichrome banding or strips. Most applications can be accomplished with either one or two strips. The layers of materials to be sealed are placed between the heated strips. Pressure is applied to assure heat is effectively transferred from the heated strips to the layers of materials to be sealed. Following a period of heat, the electricity to the strips is turned off and a cooling cycle under pressure begins. Upon completion of no heat, and thus of cooling, press pressure against the layers of material is deactivated, and heat sealing is completed. Although a significant improvement over heated platen sealing in that heat is only on for the time needed to heat seal the layers of materials, it is more difficult to control heat presented to the layers of materials, whether by time or temperature. For best results, cooling periods will typically far exceed heating periods, such that cycle times can be quite long, ranging from 30 to 60 seconds on most materials. Another negative feature is that sealed surfaces often can be discolored as a result of too much heat. Impulse sealing seals from the outside of the materials to be sealed to the inside, and therefore burning can happen with or without desired result of sealing the materials.

Within approximately the same time frame, two other methods became popular: high frequency and ultrasonic heat sealing. High frequency, also known as radio frequency or dielectric sealing, uses static energy, which is then oscillated at such frequencies to produce heat. Ultrasonic sealing uses noise energy that, when oscillated at mid-range frequencies, produces heat to seal thermoplastic materials. Both methods can seal faster than impulse sealing, however both methods have limitations. For example, high frequency is limited to heat sealing only dielectric materials or materials with a dielectric coefficient. Newer applications and materials are typically not dielectric, and therefore high frequency sealing cannot easily be used. Other limitations are related to oscillation frequency which can often interfere with computers and phone systems and other electronic products.

Ultrasonic sealing limitations include a limited list of materials that can be heat sealed. Additionally, ultrasonic sealing requires a clean surface. In recent years, ultrasonic frequency levels have also been linked to several health and OSHA-work related issues.

Based on the methods used to create frequencies, the cost of respective generators is also a factor for most companies looking to implement a heat sealing solution based on high frequency or ultrasonic heat sealing. As the length of the seal increases, so does cost of generating enough heat energy to produce the seal.

Although all four prior methods disclosed herein can be used to make a seal, there has been a need for technology that can seal all materials and is not limited by application, the aesthetics of a resultant seal, length of continuous seal, time to make the seal or the cost of equipment to make the seal.

The invention disclosed herein represents the latest technology development in the field of heat sealing layers of materials. The present low frequency modulated heat sealing or pulsing is a technology based on low frequency oscillation of heat energy. This invention discloses oscillation beyond one pulse of the resistance heating element such as a Nichrome banding medium. Other heat transfer mediums can also be used and will be addressed in future patent filings.

It is thus an object of the present invention to provide a method and an apparatus for heat sealing two or more sheets or other pieces of material together, particularly flexible sheets, whether they are of the same or of different or dissimilar materials, and whether they are of the same or different thicknesses, and in numbers up to fifteen sheets or more at one time.

It is another object of the present invention to provide such a method and apparatus which is suitable for sealing virtually all thermoset and thermoplastic materials, as well as other materials together, though it is noted that sealing thermoset materials requires the use of sealing tape.

It is still another object of the present invention to provide such a method and apparatus which can create seals of great length in the same time, or substantially the same time, required to create a much shorter seal.

It is yet another object of the present invention to provide such a method and apparatus which produces a heat seal much more rapidly than prior methods, on the order of perhaps 6 or 8 seconds, in large part because of cooling times that are much shorter than for prior methods.

It is a still further object of the present invention to provide such a method and apparatus which does not raise the temperature of the pieces of material to be sealed together to levels that yellow or otherwise damage the materials, but rather raises temperature to levels and with heating pulse and cooling interval durations to deliver packages of heat into a given material at a rate it can absorb, somewhat analogous to a wicking action.

It is finally an object of the present invention to provide such a method and apparatus which does not produce interference with computer or phone systems or other electronic products, is inexpensive to manufacture and maintain, is easy to use, is programmable to optimum use with different materials, and is reliable.

SUMMARY OF THE INVENTION

The present invention accomplishes the above-stated objectives, as well as others, as may be determined by a fair reading and interpretation of the entire specification.

A heat sealing apparatus is provided, including a first sealing bar having a first sealing bar contact surface with a first resistance heating element extending along the upper sealing bar contact surface; a second sealing bar having a second sealing bar contact surface; a sealing bar moving mechanism for moving the first sealing bar and the second sealing bar away from each other, as well as toward each other into compression contact; a power pulsing mechanism including a microprocessor operating a computer program for delivering electric power pulses to the first resistance heating element in selected pulse durations separated by at least one selected interval duration and at a frequency between 0.001 and 5000 Hertz; and an electric power source and an apparatus circuit including the first resistance heating element and the sealing bar moving mechanism.

The apparatus preferably additionally includes a second resistance heating element extending along the second sealing bar contact surface. The first and second resistance heating elements preferably are ribbon shaped. The heating element preferably is formed of a combination of nickel and chrome.

The bar moving mechanism preferably includes a pneumatic cylinder which is connected to and lifts the first sealing bar relative to the second sealing bar to space apart the first sealing bar and the second sealing bar, and to lower the first sealing bar into contact with the second sealing bar with compressive force. The first sealing bar and the second sealing bar optionally are part of a poster style press.

The method is provided of sealing at least first and second pieces of material together using the above described apparatus including the steps of operating the bar moving mechanism to space the first and second sealing bars from each other, stacking at least two sheets of material to be sealed together into face to face contact with each other, and placing the stacked sheets between the spaced apart first and second sealing bars; operating the sealing bar moving mechanism to bring the first and second sealing bars toward each other and into compressive contact with the stacked sheets such that the sheets are compressed together with a desired magnitude of force; actuating the power pulsing mechanism deliver pulses of electricity through the first and second resistance heating elements, which thereby deliver corresponding pulses of heat into the sheets of material.

The method is further provided of sealing the at least first and second pieces of material together using an apparatus including the steps of placing the pieces of material between the first and second sealing bars; activating the apparatus start switch, thereby starting a pulse and interval sealing cycle by powering on the first resistance heating element for a certain pulse duration; powering off the first resistance heating element; leaving the first resistance heating element powered off for a certain interval duration; closing the interval duration; permitting the pieces of material to cool for a final cooling duration; and operating the bar moving mechanism to move the first sealing bar away from the second sealing bar to free the pieces of material. The method optionally includes the additional step of repeating the pulse and interval sealing cycle a certain number of times. In these methods, an interval duration preferably refers to the time in which a specific type of material of a given thickness can absorb heat energy.

BRIEF DESCRIPTION OF THE DRAWINGS

Various other objects, advantages, and features of the invention will become apparent to those skilled in the art from the following discussion taken in conjunction with the following drawings, in which:

FIGS. 2-2E are illustrations of display window examples.

DETAILED DESCRIPTION OF THE PREFERRED EMBODIMENTS

Figure 1:
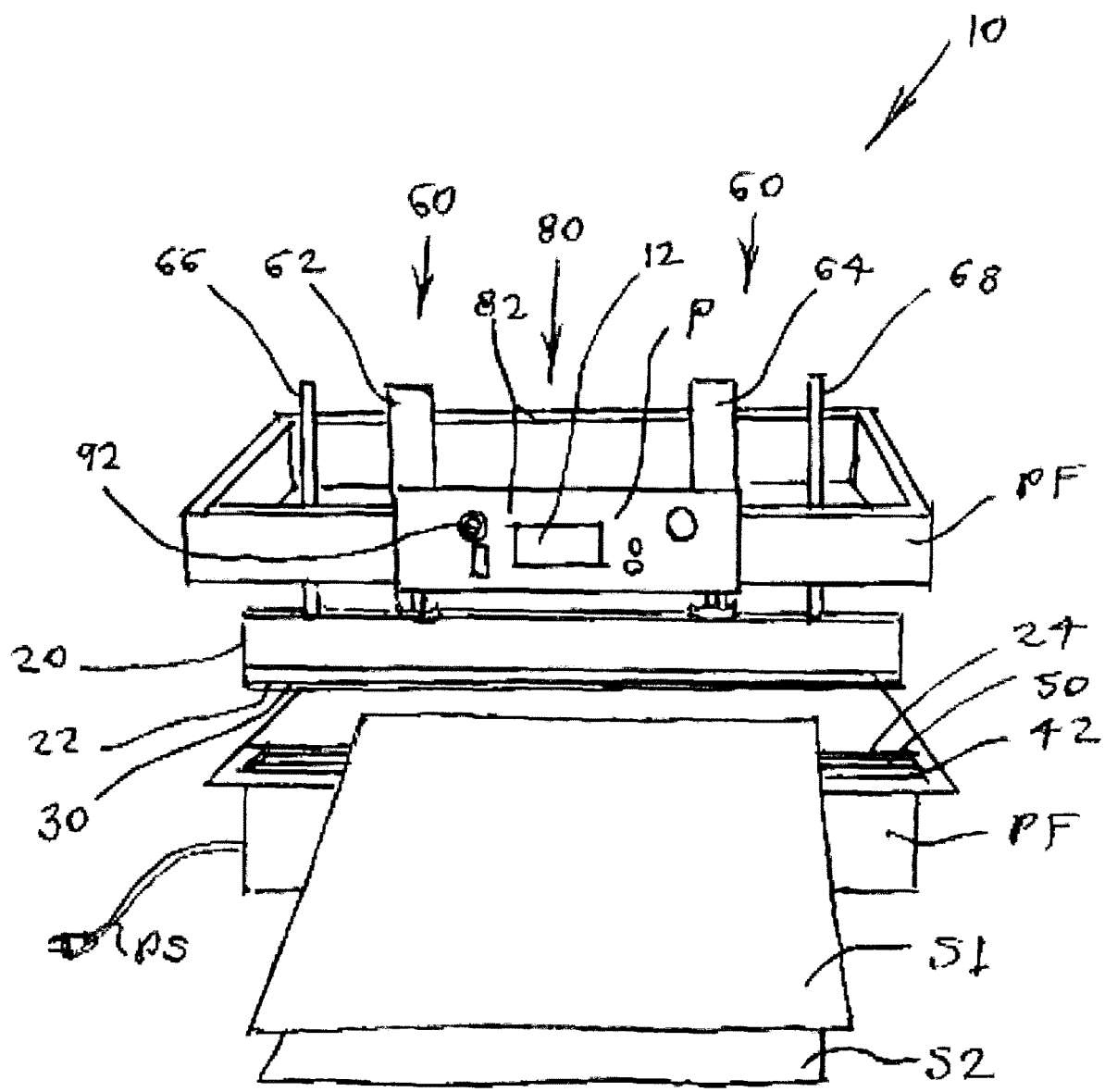
FIG. 1 is a perspective view of an exemplary press apparatus embodying the features of the present invention, and first and second sheets of material positioned for sealing.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 3:
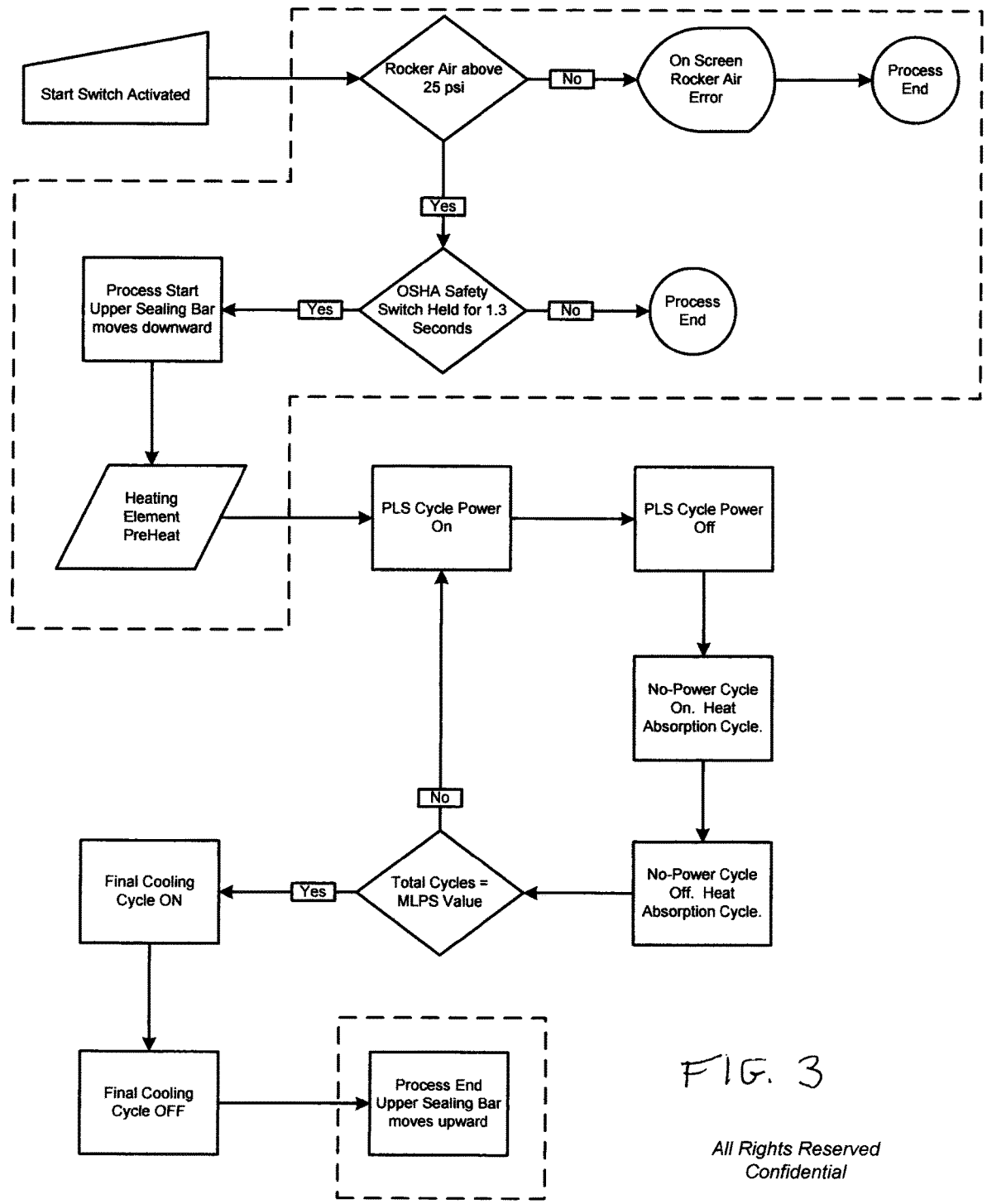
FIG. 3 is a flow chart showing the method steps executed by the present computer program, with optional steps being contained within a broken line.

Referring to FIGS. 1-3, an apparatus 10 and a method of using apparatus 10 are disclosed for heat sealing sheets S1 and S2 of material together, where the apparatus 10 includes a first sealing bar 20 with a first resistance heating element 30 extending along the first sealing bar contact surface 22, and a second sealing bar 40 with a second resistance heating element 50 extending along the second sealing bar contact surface 42, and sealing bar moving means 60 for moving the first sealing bar 20 and second sealing bar 40 away from each other as well as toward and into compression contact with each other, a power pulsing means 80 for delivering electric power to the first and second resistance heating elements 30 and 50, respectively, in measured intermittent pulses and intervals between pulses, an electric power source PS and an apparatus circuit 90 including the first and second resistance heating elements 30 and 50 and the sealing bar moving means 60. The preferred embodiment of apparatus 10 places the first sealing bar 20 above the second sealing bar 40, and as a result for purposes of describing this embodiment the first sealing bar 20 will be referred to as the upper sealing bar 20, and the second sealing bar 40 will be referred to as the lower sealing bar 40. See FIG. 1. The upper sealing bar 20 is mounted on vertical guide rods 66 and 68 slidably extending through ports in the press frame PF to be vertically moveable, while the lower sealing bar 40 is fixedly mounted to the press frame PF.

The power pulsing means 80 preferably includes a microprocessor 82 running a computer program P which permits selection of various pulse durations and interval durations to optimize heat pulsing, these durations preferably being pre-programmed for specific types of materials to be sealed together. The pulse durations are heating durations, and the interval durations are cooling durations, and are indicated in a display in an apparatus screen 1. See FIGS. 2-2E. The bar moving means 60 preferably includes at least one and preferably two pneumatic cylinders 62 and 64 which is connected to and spaces, such as through elevating the upper sealing bar 20 relative to the lower sealing bar 40, to space apart the upper and lower sealing bars 20 and 40, and which also lowers the upper sealing bar 20 into contact with the lower sealing bar 40 with compressive force. The heat pulse packets are believed to essentially travel to interface(s), and then seal outward. For marketing purposes, the present pulse sealing may be referred to as "puls".

The apparatus 10 preferably is a simple "poster style" press, modified to include these inventive features. Configuring the apparatus 10 in the form of any of a variety of other types of presses is contemplated as well, such as a cantilever press. The sealing bars 20 and 40 may have a variety of shapes other than the preferred elongate shape, including non-elongate and non-linear shapes such as square or rectangular blocks. The electric power source PS preferably is a power cord PS extending to a wall outlet or other power source connection.

The heating elements 30 and 50 preferably are ribbon or banding types, such as Nichrome banding strips. Flat wire as narrow as ⅛ inch is suitable. It is contemplated that the heating elements 30 and 50 can have other configurations and compositions as well. Each can be shaped as a bar or block, for example, rather than as a ribbon. Yet not all configurations or materials are suitable. A heating element in the form of a round wire would tend to cut materials to be sealed, and thus is not suitable, and Cal Rod is not believed to be suitable as a heating element material.

It is noted generally that the sheets of material S1 and S2 need not be configured as sheets, but be pieces of material having other shapes as well, such as bars or blocks. Furthermore, more than two sheets or pieces of material can be sealed together at once using the present apparatus 10 and method. It is contemplated that as many as 15 sheets of material, or very likely more, may be sealed at once in this way. It also must be emphasized that the sheets or pieces of material can be, but need not be, formed of the same material. Each sheet of piece of material can be made of a different material relative to the other sheets of pieces of material and still be sealed together using the present apparatus 10 and method, and with the same advantages provided by the present invention.

Method

In practicing the invention, the following method may be used. The method of using apparatus 10 to seal sheets of material together is primarily or entirely executed by the computer program, with additional steps being performed by one of a human operator and by the computer program P operating apparatus 10. A robotic arm (not shown) and gripper (not shown), or other equivalent means, optionally are provided and operationally connected to the computer program P to grip and lift sheets of material S1 and S2, stack them and place them between, and subsequently remove them from between, the sealing bars 20 and 40. A "face" of a sheet of material, as used herein, is one of either of the two broad surfaces of a sheet. Thus, placement of the sheets of material S1 and S2 and any additional sheets "face to face" and thereby stacking the sheets has its normal meaning, namely placing one sheet substantially parallel and directly adjacent to another sheet, so that either of the broad surfaces or faces of one sheet is flat against one of the broad surfaces of the other sheet. Thus, one of the human operator and the computer program through the use of the robotic arm and gripper operates the bar moving means 60 to space the upper and lower sealing bars 20 and 40 from each other, stacks at least two sheets of material S1 and S2 to be sealed together into face to face contact with each other, and places these stacked sheets S1 and S2 between the spaced apart the upper and lower sealing bars 20 and 40. Then one of the human operator and the computer program P, such as through operation of a switch in the apparatus circuit 90, operates the sealing bar moving means 60 to bring the upper and lower sealing bars 20 and 40 toward each other and into compressive contact with the sheets S1 and S2 so that the sheets S1 and S2 are compressed together with a desired magnitude of force. Then the power pulsing means 80 is actuated either manually by the operator or automatically by program P, to begin delivering pulses of electricity through upper and lower resistance heating elements 30 and 50, which thereby deliver corresponding pulses of heat into sheets of material S1 and S2.

The method steps preferably executed by the program P are illustrated in the flow chart of FIG. 3, and are as follows. As set forth in the flow chart, the method includes the steps of either the operator or the program P activating the apparatus start switch 92, starting the sealing cycle by powering on the heating elements 30 and 50 for a certain pulse duration, indicated by the notation PLS Cycle Power On, powering off the heating elements 30 and 50, indicated by the notation PLS Cycle Power Off, leaving the heating elements 30 and 50 powered off for a certain interval duration, indicated by the notation No-Power Cycle On, Heat Absorption Cycle, closing the interval duration, indicated by the notation No-Power Cycle Off, Heat Absorption Cycle, and repeating this pulse and interval cycle 0 through a certain pre-set number of time, indicated by the notation Total Cycles=MLPS Value, permitting the sheets S1 and S2 to cool for a final cooling duration, indicated as Final Cooling Cycle Off, and operating the bar moving means 60 to move the upper sealing bar 40 upward to free sheets S1 and S2, indicated as Process End Upper Sealing Bar moves upward.

Optional additional method steps indicated in the flow chart are those enclosed by a broken line, and include the press maintenance steps of testing the pneumatic pull of the bar moving means 60 cylinder and piston, indicated as Rocker Air above 25 psi, and if the pull is not substantially 25 psi, displaying an indication of this on the display screen 12, indicated as On Screen Rocker Air Error, and then ending the method or process, and if the pull is substantially 25 psi, then executing the test of an OSHA Safety Switch Held for 1.3 Seconds, and if it does not pass then ending the method or process, and if it does pass, only then operating the bar moving means 60 to start the upper sealing bar 20 movement downwardly, and then activating the heating elements 30 and 50 to begin pre-heating elements 30 and 50 and following such pre-heating by starting the sealing cycle as above described.

The pulses of heat and intervals between pulses provided by the present invention are not arbitrary, but rather are selected so that the pulses deliver packets of heat into the sheet materials for durations short enough that they raise sheet outer surface temperatures only to levels below that which would yellow or otherwise damage the sheet materials, and yet for durations long enough that they progressively raise the temperature of the sheets S1 and S2 where they abut each other to a level that causes sufficient melting of the sheet materials to bond them together. Each cooling interval between pulses is of a duration to permit the sheet materials to absorb the heat to their inner contacting surfaces while outer sheet surface temperatures fall accordingly as the temperature within the sheets S1 and S2 progressively equalizes. Only then does a next pulse optionally begin and repeat the cycle a pre-programmed number of times. See Flow Chart of FIG. 3. As a result, unlike in impulse heat sealing, damaging temperatures are not reached, and heat is transferred into the materials in a series of discrete packages, which weld the sheets S1 and S2 together far more quickly and efficiently. Once again, unlike in impulse heat sealing, pulses and intervals between pulses are selected relative to the material or materials of the sheets being sealed together, that will deliver packages of heat that can be absorbed into the particular material at the natural rate for the material.

Each oscillation with heat energy forms a pulse driving heat into the layers to be sealed. Contrary to other heat sealing methods, the non-heat energy oscillations form a pulse width used for absorption of heat energy into the layers of materials to be sealed. Low frequency modulated heat sealing may consist of a varying number of heat energy pulses and non-heat energy pulses. Pulse width is specified in units of time. For example, sealing three layers of a heavy thermoplastic material may require 12 cycles of heat energy pulse width of 0.20 second and non-heat energy pulse (absorption) width of 0.10 seconds; followed by a period of cooling time of three seconds. In this example, the three sheets or layers were heat sealed in 6.6 seconds. Current testing frequencies for the present invention have ranged from 0.001 to 1,200 Hz. Based on the scope of use and available current technology, the maximum frequency is anticipated to be about 5000 Hz (5 KHz). As the technology improves and higher speed processing becomes available, the maximum frequency is subject to increase.

Low frequency modulated heat sealing depends on the material's natural desire or ability to absorb heat. Most other methods of heat sealing work on the basis of pushing heat through the materials to be sealed, such as by raising the outer temperatures of sheet materials to damaging levels. The present low frequency modulated heat sealing differs in that it provides the layers or sheets of material time to absorb the energy produced by each heat energy pulse. This is a key feature of the present invention. Small packets of heat energy are absorbed before delivering more heat energy. The number of packets of heat depends on type of material and thickness of material. And this packet heat sealing method effectively seals from the inside to the outside. The process is more natural and uses far less heat energy than other methods, resulting in a "cooler" seal and less machine power to accomplish heat sealed results. This gradual method reduces the time needed to apply a final cooling time. An additional benefit associated with "cooler" sealing is increased production. Less cycle time increases production volume and decreases wait time for repetition.

The present method compares favorably with other methods used to seal heavy thermoplastic layers of material. Compared to impulse sealing, the present method involving low frequency modulation is significantly faster. In the example where low frequency modulation is 6.6 seconds, impulse sealing would be closer to 50 seconds. High frequency and ultrasonic methods would be closer in sealing times, however, but gravely limited by which materials could be heat sealed.

As an alternative to directly sealing the sheets S1 and S2 together, a strip of sealing tape (not shown) can be placed between the sheets S1 and S2 of material to be sealed, which melts and bonds the adjacent materials together with the pulsed application of heat. While the use of sealing tape is not new, the present apparatus 10 and method once again permit the sheets S1 and S2 of material to be bonded together in this way in a fraction of the time needed using prior methods and without damaging the sheet material.

The present low frequency modulated sealing can be applied to virtually any length seal, and often without modifying the overall sealing time. So if it takes 6.6 seconds to produce a seal 126 inches in length, it is very conceivable it will take the same total sealing time to seal an application 294 inches in length.

Parameter modifications are also reduced as the number of cycles increase. For example, if only two cycles are used, sealing parameters may be less common among a range of materials.

Whereas using 20 cycles permits more opportunities for heat energy absorption resulting in a more common sealing parameter affecting a larger range of dissimilar materials.

It is contemplated that materials having shapes other than sheets or layers, such as blocks or bars, may be sealed together using the present apparatus and method. It is further contemplated, although less preferred, that a heating element be provided along only one of the first and second, or upper and lower sealing bars 20 and 40, or that only one of the first and second heating elements 30 or 50 be operated.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A heat sealing apparatus for sealing pieces of material together, comprising:
    a first sealing bar having a first sealing bar contact surface with a first resistance heating element extending along said first sealing bar contact surface;
    a second sealing bar having a second sealing bar contact surface;
    sealing bar moving means for moving at least one of said first sealing bar and said second sealing bar, such that said first sealing bar and said second sealing bar are one of separated from each other and brought into compression contact with each other;
    power pulsing means comprising a microprocessor operating a computer program for delivering electric power pulses to said first resistance heating element in selected pulse durations separated by at least one selected interval duration and at a frequency between 0.001 and 5000 Hertz;
    and an electric power source and an apparatus circuit including said first resistance heating element secured to one of said first sealing bar and said second sealing bar to move with the sealing bar, and said sealing bar moving means.

2. The apparatus of claim 1, additionally comprising a second resistance heating element extending along said second sealing bar contact surface.

3. The apparatus of claim 1, wherein said first resistance heating element is ribbon shaped.

4. The apparatus of claim 2, wherein said second resistance heating element is ribbon shaped.

5. The apparatus of claim 4, wherein said heating elements are formed of a combination of nickel and chrome.

6. The apparatus of claim 1, wherein said bar moving means comprises a pneumatic cylinder which is connected to and lifts said first sealing bar relative to said second sealing bar to space apart said first sealing bar and said second sealing bar, and to lower said first sealing bar into contact with said second sealing bar with compressive force.

7. The apparatus of claim 1, wherein said first sealing bar and said second sealing bar are part of a poster style press.

8. A method of sealing at least first and second pieces of material together using an apparatus comprising a first sealing bar having a first sealing bar contact surface with a first resistance heating element extending along a first sealing bar contact surface; a second sealing bar having a second sealing bar contact surface; bar moving means for moving at least one of the first sealing bar and the second sealing bar, such that the first sealing bar and the second sealing bar are one of separated from each other and brought into compression contact with each other; power pulsing means comprising a microprocessor operating a computer program for delivering electric power pulses to said first resistance heating element in at least two selected pulse durations separated by at least one selected interval duration; and an electric power source and an apparatus circuit including the first resistance heating element and the sealing bar moving means, comprising the steps of:
 operating the bar moving means to space the first and second sealing bars from each other; stacking at least the first and second sheets of material to be sealed together into face to face contact with each other, and placing the stacked sheets between the spaced apart the first and second sealing bars;
 operating the sealing bar moving means to bring the first and second sealing bars toward each other and into compressive contact with the stacked sheets such that the sheets of material are compressed together with a desired magnitude of force;
 actuating the power pulsing means deliver pulses of electricity through the first and second resistance heating elements, which thereby deliver corresponding pulses of heat into the sheets of material.

9. A method of sealing at least first and second pieces of material together using an apparatus comprising a first sealing bar having a first sealing bar contact surface with a first resistance heating element extending along the first sealing bar contact surface; a second sealing bar having a second sealing bar contact surface; bar moving means for moving at least one of the first sealing bar and the second sealing bar, such that the first sealing bar and the second sealing bar are one of separated from each other and brought into compression contact with each other; power pulsing means comprising a microprocessor operating a computer program for delivering electric power pulses to said first resistance heating element in at least two selected pulse durations separated by at least one selected interval duration; and an electric power source and an apparatus circuit including the first resistance heating element and the sealing bar moving means, comprising the steps of:
 placing at least the first and second pieces of material between the first and second sealing bars;
 activating the apparatus start switch, thereby starting a pulse and interval sealing cycle by powering on the first resistance heating element for a certain pulse duration;
 powering off the first resistance heating element;
 leaving the first resistance heating element powered off for a certain interval duration;
 closing the interval duration;
 permitting the pieces of material to cool for a final cooling duration;
 and operating the bar moving means to move the first sealing bar away from the second sealing bar to free the pieces of material.

10. The method of claim 9, comprising the additional step of:
 repeating the pulse and interval sealing cycle a plurality of times.

11. The method of claim 8, wherein the at least first and second sheets of material are placed between the spaced apart first and second sealing bars automatically by gripping the sheets of material with a robotic gripper operated by the computer program.

12. The method of claim 9, wherein the at least first and second sheets of material are placed between the spaced apart first and second sealing bars automatically by gripping the sheets of material with a robotic gripper operated by the computer program.

13. The method of claim 8, wherein an interval duration refers to the time in which a specific type of material of a given thickness can absorb heat energy.

14. The method of claim 8, wherein an interval duration refers to the time in which a specific type of material of a given thickness can absorb heat energy.

15. The method of claim 8, wherein said first and second pieces of material comprise a plurality of sheets of material of one of the same thickness and varying thicknesses.

16. The method of claim 9, wherein said first and second pieces of material comprise a plurality of sheets of material of one of the same thickness and varying thicknesses.

* * * * *